United States Patent [19]
Battistella

[11] Patent Number: 4,841,881
[45] Date of Patent: Jun. 27, 1989

[54] "DEVICE FOR SPACING APART, AT DESIRED DISTANCES, THE REFRIGERATING PLATES, IN HORIZONTAL PLATE FREEZERS"

[75] Inventor: Guido Battistella, Milan, Italy

[73] Assignee: Stal Samifi S.P.A., Italy

[21] Appl. No.: 84,898

[22] Filed: Aug. 13, 1987

[51] Int. Cl.4 .............................................. A47B 3/08
[52] U.S. Cl. ...................................... 108/91; 211/188
[58] Field of Search ................. 108/91, 101; 211/188; 206/499, 509, 511; 312/111, 140, 229; 52/790, 564

[56] References Cited

U.S. PATENT DOCUMENTS

| | | | |
|---|---|---|---|
| 432,425 | 7/1890 | Moan | 108/159 |
| 1,331,862 | 2/1920 | Claus | 206/511 |
| 2,146,925 | 2/1939 | Ahrbecker et al. | 206/511 |
| 3,180,288 | 4/1965 | McCowan | 108/101 |
| 3,407,016 | 10/1968 | Kronenberger | 312/229 X |
| 3,448,914 | 6/1969 | Scholz | 206/511 X |
| 3,695,190 | 10/1972 | Bucholz | 211/188 X |
| 3,741,404 | 6/1973 | Jourdain | 108/91 |
| 3,747,539 | 7/1973 | Calzaretto | 108/91 |
| 3,834,324 | 9/1974 | Lang | 211/188 X |
| 3,847,458 | 11/1974 | Nowak | 211/188 X |
| 4,223,602 | 9/1980 | Mitter | 211/188 X |
| 4,293,072 | 10/1981 | Hill et al. | 206/509 X |
| 4,573,749 | 3/1986 | Massaro | 312/111 X |

FOREIGN PATENT DOCUMENTS 71875 12/1947 Denmark ............................ 108/101

Primary Examiner—Peter A. Aschenbrenner
Attorney, Agent, or Firm—Steinberg & Raskin

[57] ABSTRACT

Device for spacing apart the refrigerating plates in horizontal plate freezers, comprising spacers and relevant seats borne by the plates, the seats being provided on the lower faces of the plates, and the spacers being prevented from separating from the seats due to the action of gravity.

12 Claims, 3 Drawing Sheets

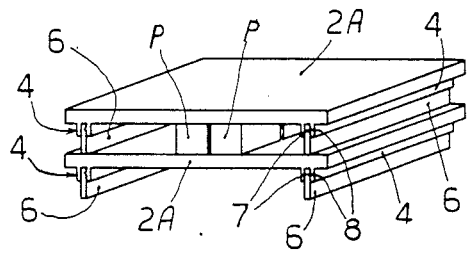
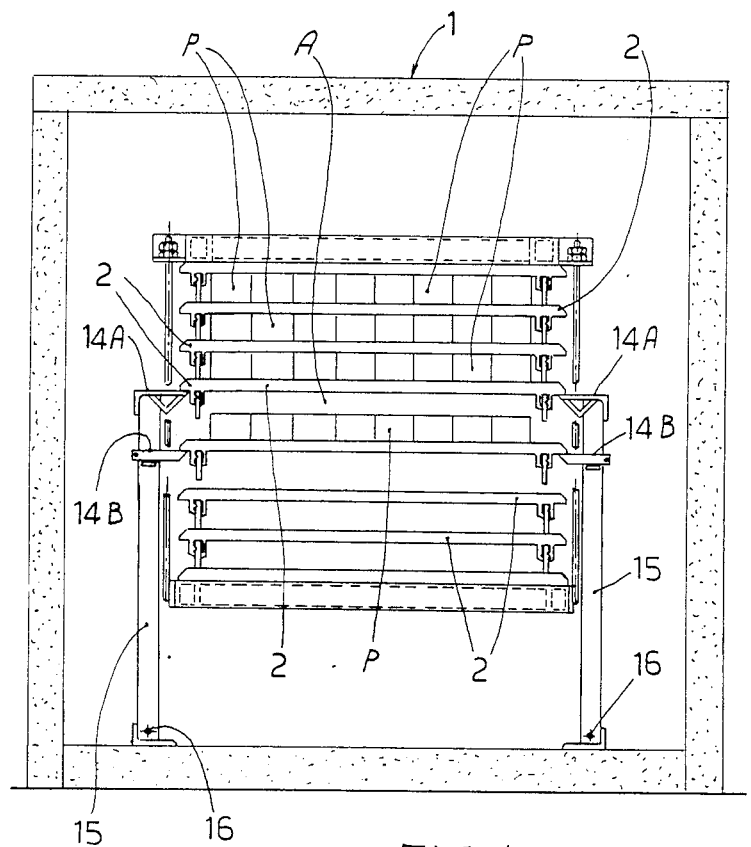
FIG. 4
FIG. 1

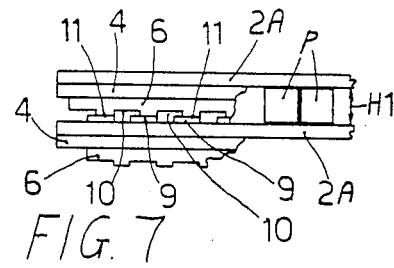
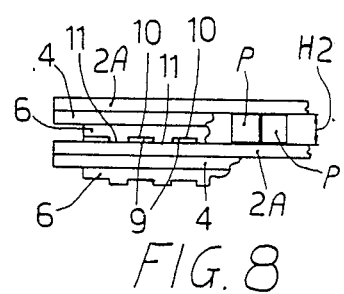
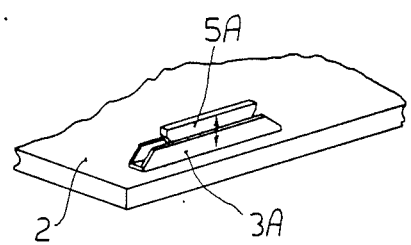
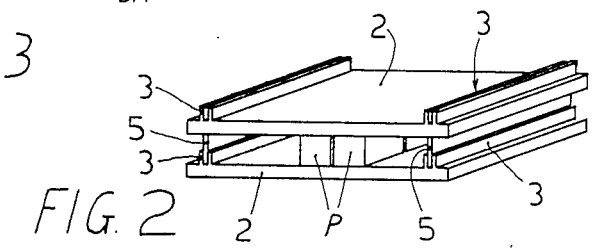

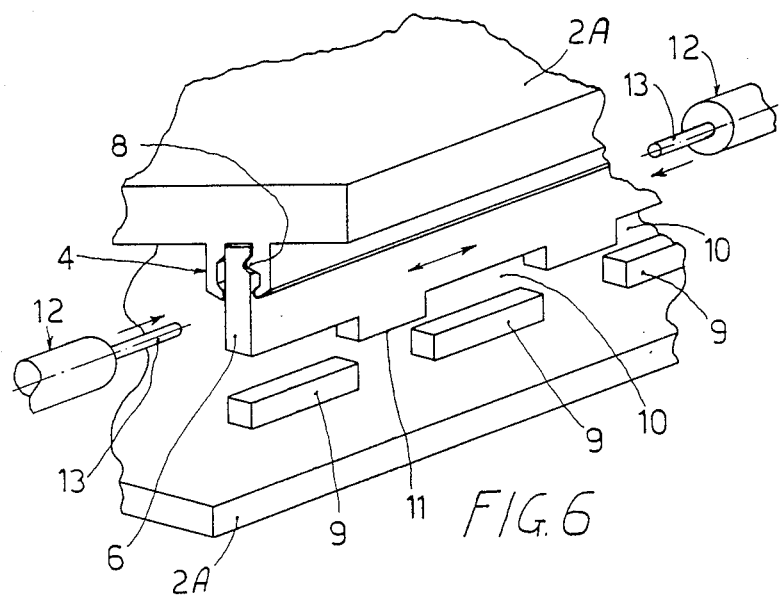
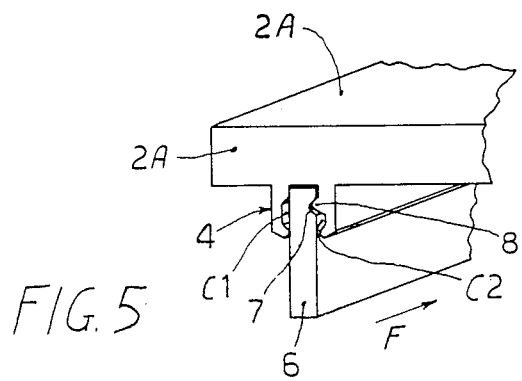

"DEVICE FOR SPACING APART, AT DESIRED DISTANCES, THE REFRIGERATING PLATES, IN HORIZONTAL PLATE FREEZERS"

BACKGROUND OF THE INVENTION

The present invention relates to a device for spacing apart, exactly by the desired (and variable) lengths, the refrigerating plates of the so-said "horizontal plate" freezers.

It is known that in the freezers of such type there is a set of parallel, horizontal plates on which the (alimentary) products are placed.

Means are provided for producing cold inside the plates, i.e., these latter are cooled to a low temperature, determined according to the use requirements.

All horizontal-plate freezers for deep-freezing packed alimentary products use, as the principle for the transmission of cold, the "direct contact" between the cold plates and the product: i.e., the heat is transmitted by conduction.

When the product is inserted between two cold plates, and is in contact with them, a double heat transmission occurs thanks to the "double contact".

In order to practically embody the above principle, the plate freezers are all structured in such a way that, when they operate, in a first step the plates are "opened" (i.e., sufficiently spaced apart from each other) for the introduction of the product, and in the subsequent step they are "closed again" (i.e., approached to the product), to accomplish the "double contact".

All horizontal-plate freezers, in order to properly use the "double-contact", have their cold plates provided with spacers of the proper height, either fixed or adjustable, housed in the nearby of their outer edge, so that, in their closed position, said plates will be correctly placed parallel to one another, and in contact with the product, without damaging it.

It is clear that the use of improper spacers causes drawbacks to this type of deep-freezing, in that if they are higher than the product to be deep-frozen, a reduced heat transmission occurs (loss of the double contact), and, on the contrary, the damaging occurs of the packed articles if they are lower than them.

A normal and frequent need is, hence, for the users of said machines, changing the height of the spacers and conforming it to the packages to be deep-frozen. Said operation requires presently a considerable time, because the solution, always adopted by the designers for the purpose of fastening the spacers to the plates, has been of housing them inside seats provided on the upper face of the plates. These seats, during the weekly cycles of freezer cooling and defrosting, are filled with water which, during the cooling step, freezes, sealing and sticking the spacer inside the same seat wherein it is located, rendering it irremovable.

As a result, the operation of "replacement or adjustment of the spacers" obliges the user to defrost the freezer to unstick the spacers from the seats inside which they are inserted, and also obliges him to previously unload the product contained inside the machine, in order to prevent it from being heated. Thus, not only both of said operations must be carried out, but they cannot be carried out at the same time, resulting in a considerable time waste.

When the operation on the spacers can be combined with freezer cleaning operations, in general every 10 days, a defrosting operation is anyway carried out. In this case, the adaptation of the spacers does not cause time losses besides those strictly necessary to carry out the replacement.

But nowadays the industries tend to immediately adjust their production of deep-frozen foodstuffs to the demand by the market, which is variable, and tend to store as little as possible, so that they are obliged to change the type of product to be deep-frozen on a same freezer also twice a day.

It is in these cases that the solutions of the prior art, which require even 3–4 hours to be performed, result in large production losses.

SUMMARY OF THE INVENTION

The basic purpose of the present invention is to overcome the above cited drawbacks, i.e., to eliminate large time wastes which presently occur when the spacers are changed or their height is adjusted, when the need for changing the distance between the plates arises, when the processed products are changed.

In order to achieve said purpose according to the present invention a device is provided which is essentially characterized in that for each refrigerating plate, the seats for the spacers are provided on the lower face of the same plate, so that the opening of the seat is facing downwards, means being provided for mutual engagement between the spacer and the inner surface of the seat, suitable to prevent the spacer from coming out of the same seat due to gravity.

BRIEF DESCRIPTION OF THE DRAWINGS

In order to better explain the characteristics of the device of the present invention, and the advantages deriving from it, examples of practical embodiments of the device according to the same invention is now disclosed, as referred to an automatic machine, and illustrated in the hereto attached schematic drawing, wherein:

FIG. 1 shows, in a completely schematic sectional view according to a vertical plane, an automatic horizontal-plate freezer, wherein only some of the essential components of said freezer are shown (while other components thereof have been omitted for the sake of simplicity);

FIG. 2 shows a perspective view of a detail comprising a system of spacers of a type known from the prior art;

FIG. 3 shows a perspective view of a detail of a device of type known from the prior art, wherein the spacer is adjustable;

FIG. 4 shows a perspective view of a detail comprising an example of practical embodiment of the device according to the present invention;

FIG. 5 shows a perspective view on a larger scale of a detail of the practical embodiment of the device, as of FIG. 4, according to the present invention;

FIG. 6 shows a device for obtaining two different heights.

FIG. 7 shows said device in a determined position.

FIG. 8 shows the same device in another condition.

DESCRIPTION OF THE PREFERRED EMBODIMENTS

The horizontal-plate freezer shown in FIG. 1 comprises an outer shell, generally referred to by the reference numeral 1, whose walls are made from a suitable insulating material.

Inside the shell 1, a set of horizontal plates, referred to by the numeral 2, are provided.

When the freezer is operating, the plates 2 are "cold", i.e., they are able to deep-freeze the products which are in contact (as it is better specified below) with the same plates.

In fact, means are provided (per se known and, for the sake of simplicity, not shown in the figures), capable of generating cold inside the plates, so that the two surfaces (the upper surface, as well as the lower surface) of each plate are cold enough, so to accomplish the deep-freezing of the products.

The products are inserted inside the freezer through an "inlet mouth" referred to by A, provided through a wall of the outer shell 1.

For the coming out of the products, on a wall of said outer shell, parallel and opposite to the wall comprising the mouth A, an "outlet mouth" is provided.

To "load" the freezer with products, i.e., to insert inside the shell 1 the products, and place them on the plates 2, these latter are brought, one by one, in correspondence with the inlet mouth A (and hence with the outlet mouth, which is at the same level).

When the plate 2 to be loaded is situated in said position, the plate 2 which is immediately above it is kept sufficiently spaced apart, so not to hinder the insertion of the products.

When the plate is completely loaded (i.e., when all introduced products are placed on the upper surface of said plate), a lifting movement is performed, so that the immediately below plate is brought to said position, formerly occupied by the plate which has been loaded, whilst this latter is obviously raised, in its turn, to a sufficient extent not to hinder the insertion of the products (i.e., such conditions as above described are recreated).

During the lifting, the machine accomplishes the closure of the plates, i.e., the "double contact", so that the product not only is in contact with the upper surface of the plate by which it is supported, but also comes into contact with the lower surface of the plate which is immediately above the same product.

In order to correctly accomplish said "double contact", the distance between two adjacent plates must necessarily be practically equal to the height (or thickness) of the product. Therefore, as hereinabove said, spacers are provided, due to which the plates, when are in their "closed" position, are exactly parallel to each other, in contact (double contact) with the product, without damaging it.

In as much as the products to be deep-frozen have various heights, it is evident that spacers of different heights, or adjustable spacers, are used, so that, when one wants to introduce into the freezer a product whose height (or thickness) is different from that of the preceding product, it is necessary to change the spacer, or to adjust the already inserted spacers.

In the solution known from the prior art, of FIG. 2, on the upper surfaces of the refrigerating plates 2, seats 3 are provided, which house the spacers 5, so that, when the distance between the plates has to be changed, the spacer 5 is removed from the seat, and another spacer, having a different height, is inserted inside said seat.

In the solution, it too of known type, of FIG. 3, the spacer, indicated with 5A, is, on the contrary, adjustable in height, so that, when the distance between the plates 2 must be changed, the spacer 5A is lowered or lifted (inside the seat 3A).

Also in the case shown in FIG. 3, the spacer device is provided on the upper surface of the refrigerating plate (on the same plate, an certain number of said devices are provided).

The replacement of the spacers (case of FIG. 2), or their adjustment in height (case of FIG. 3) is only possible when the machine is not cold, because, when the machine is cold, such operations would be hindered by the ice present on the freezing plate. In other words, with such systems of the prior art, the hereinabove mentioned drawbacks occur.

The device according to the present invention, illustrated in FIGS. 4 and 5, (and in FIG. 1) comprises a seat 4 for the spacer, provided on the lower face of the freezing plate. In practice, the seat 4 is integral with said plate, referred to by the reference numeral 2A.

More particularly, each refrigerating plate 2A is provided with two seats 4, respectively close to two opposite (parallel) sides of the same plate, and said seats are parallel to said sides. In FIG. 4, the spacer is shown in a simplified way, i.e., in a fully schematic way, whilst FIG. 5 shows an enlarged portion thereof, complete with all details.

The spacer, generally referred to by the reference numeral 6, is provided with a shaped groove indicated by 7, whilst the seat 4 comprises a shaped protrusion ("engagement tooth"), indicated by 8, suitable to penetrate said groove.

Therefore, when the spacer 6 is slid into the seat 4, the engagement tooth 8 penetrates the groove 7, and in such a way the spacer is supported, i.e., it cannot come out of the seat. Due to the fact that the seats 4 are provided on the lower face of the freezer plate 2A, water can drain away by gravity, i.e., can leave the seat 4, so that the formation of ice and the sticking of the spacer to the seat is prevented.

In FIG. 5, it can be observed that the contact surfaces between the spacer and the inner surfaces of the seat 4 are rather small, and that thanks to the recessions or hollows C1 and C2.

Such characteristic (minimum contact surfaces) makes easier the extraction of the spacer from the seat, or its longitudinal motion inside it.

In fact, when the spacer 6 is made to slide along its longitudinal direction (according to arrow F of FIG. 5), a very reduced friction occurs, precisely because the contact surfaces have a very small area.

The great advantage is evident, which is constituted by the fact that water can drain downwards by gravity, and hence leave the seat, so that the occurrence of ice is prevented.

In the present example (see FIG. 5), furthermore, the inner surface of the seat 4, thanks to its inclined portions, facilitates as much as possible the coming out of water.

Summing up, due to the fact that the spacer is inside a seat provided on the lower face of the plate, and to the other characteristics as hereinabove disclosed, the same spacer, besides perfectly performing the function of keeping equidistant the plates, is put in a position to avoid operating in water, because water has the possibility of draining away by gravity.

The above disclosed invention finds its ideal application on the automatic freezers. It is in fact in these that the need for avoiding dead times in general is more felt.

The requirement of using two heights for the spacers on a same freezer is frequent.

By means of a device according to the the invention, such a requirement can be satisfied by using spacers provided with joints, and providing the plates with dowels, as shown in the drawing (FIGS. 6, 7, 8). A height will be obtained with the spacers being inside the joints, and another height will be obtained with the spacers being outside the joints.

In particular, the plate 2A is provided with protrusions 9, and the spacer 6 is provided with hollows 10.

When the protrusions 9 are inside the hollows 10 (see FIG. 8), the lower height, indicated by H2, is achieved; by shifting, on the contrary, the spacer by one "step", so that its surfaces 11 come to rest on said protrusions 9, as shown in FIG. 7, the higher height, indicated by H1, is obtained.

Given that the spacers, housed in the new way as provided by the instant invention, can be moved without defrosting, the freezer, without any time waste, can be conformed to a product, or to another one, by simply longitudinally shifting the spacers during the running.

As is has been hereinabove mentioned, during the charging step, each plate is brought in correspondence with the inlet mouth (and hence with the outlet mouth) in the suitable position for being loaded, i.e., for receiving the rows of products. The overhanging plate is sufficiently spaced apart, so not to hinder the insertion of the products.

It is in this position that the spacers 6 (longitudinally movable) of the overhanging plate are shifted to reach the new height configuration (obviously, when necessary).

Mechanical, and, in particular, oleodynamic, solutions can be provided, to shift the spacers. So, e.g., two oleodynamic cylinders, like those shown in a schematic way in FIG. 6 and indicated by 12 can be provided, whose stems 13 can push the spacer, so to move it in a direction, or in the opposite direction, as shown by the respective arrows.

Furthermore components are provided according to the present invention, in order to achieve the two following purposes:

(1) constancy of level, relatively to the outer shell, of the upper plate (where the operation of spacer shifting is carried out);

(2) constancy of level of the lower plate, which must be positioned at the preestablished fixed level (in correspondence with the inlet mouth), to allow the product to be loaded.

It is known that in the machines of this kind, supports are provided beside the plates, which engate the same plates as these latter are lifted to be positioned in front of the inlet mouth.

Such a kind of supports are those, e.g., as indicated by 14A in FIG. 1, fastened to rods 15 hinged in 16 to the stationary structure of the machine.

Generally, on said supports 14A, the plate above the plate to be loaded rests; the same supports sustain also the weight of all the plates which are above said upper plate.

The lower plate, viz., the plate to be loaded, is generally hanging from the above-said plates by means of tie-rods.

According to the present invention, means similar to the supports 14A, which are herein indicated by the reference numeral 14B, are also used to support the lower plate, i.e., the plate to be loaded.

More particularly, to the rod 15, besides the support 14A, designed to support the upper plate, another, similar support, indicated by the reference numeral 14B, is fastened, as said below, at a lower level, in the exact position in order to support the bottom plate at the proper level for the loading of the same plate.

The supports 14B, differently from the supports 14A, which are fastened to the rods 15, are linked to said rods in such a way as to be adjustable in height, e.g., revolving around a pivot, to allow the plates to move.

When the spacers are changed in order to vary the distance between the plates, if the same lower plate were hanging from the upper plates, and resting on the lower plates, said lower plate would not be placed at said suitable level for the loading. In other words between the level at which said lower plate would be, and said level suitable for the loading, a difference in level, which could even be considerable, would exist, as a function of the change in distance between two adjacent plates, and the number of the plates.

Such a drawback does not occur when supports 14B are adopted.

I claim:

1. Device for spacing apart plates from one another at discrete distances, such as freezing/refrigerating plates in a horizontal plate freezer/refrigerator, comprising the combination of at least one spacer for maintaining adjacent plates at a spaced apart, discrete distance, and a seat provided on a lower surface of an upper plate of the adjacent plates when the plates are assembled in the stack, for receiving said spacer, said seat comprising an opening arranged therein to face downwardly towards a lower plate of the adjacent plates when the plates are assembled in the stack, and means for preventing separation of said spacer from said seat due to gravity when said spacer is received by said seat, wherein said seat is formed by two substantially parallel-extending protrusions extending downwardly towards the lower plate when the plates are stacked and also extending in a substantially longitudinal direction thereof, with said seat opening defined between inner surfaces of said protrusions facing one another, said means comprise said seat being provided with a shaped engagement tooth extending therealong, and said spacer comprising a shaped groove extending along a side thereof over the substantially longitudinal direction thereof, said respective tooth and groove being shaped to mate with one another when said spacer is received in said seat, and said tooth being positioned on one of said inner surfaces of said protrusions, said protrusions define an inner area of said seat closest to said plate which is shaped to contact said spacer when the same is received in said seat, and each said protrusion comprises an outer area situated on an opposite side of said inner area from said plate, and shaped to define a recess between the same and said spacer when said spacer is received in said seat, whereby area of contact between said spacer and seat is minimized and water can drain out of said seat.

2. The combination of claim 1, wherein said recesses of said protrusions comprise each edges which are inclined with respect to a plane extending in said substantially longitudinal direction.

3. Device according to claim 1,
additionally comprising means for adjusting spacing between the adjacent plates between two different distances, a greater distance and a smaller distance,
said means comprising the lower plate having, on an upper surface thereof, a series of discrete, protruding projections extending in a substantially longitudinal direction,
with recesses being formed between adjacent projections, and
said spacer comprising, along one edge thereof, a series of indentations spaced apart from one another and extending therealong,
said indentations and projections formed to mate with one another when said spacer and plates are assembled and thereby define said smaller distance between the adjacent plates, and
said edge of said spacer between said indentations and said projections of the lower plate form to contact one another when said spacer and the plates are assembled and thereby define said greater distance between the adjacent plates.

4. The combination of claim 3, wherein
said smaller distance is substantially equal to distance between the edge of said spacer and an opposite edge, and
said greater distance is substantially equal to said distance between said respective edges of said spacer plus height of said projections or depth of said recesses between said projections.

5. The combination of claim 3, additionally comprising
two said seats on the upper plate, and
two said series of projections on the lower plate,
with each said series provided substantially adjacent to a longitudinally-extending edge of the lower plate, and
each said seat provided substantially adjacent to a longitudinally-extending edge of the upper plate, and
two spacers, each formed to be received in a respective seat of the upper plate.

6. The combination of claim 1, additionally comprising
two said seats formed on the upper plate, and
two said spacers, each being formed to be received in a respective seat.

7. The combination of claim 3, additionally comprising
means for shifting said spacer in the longitudinal direction comprising an oleodynamic cylinder having a stem coupled to one longitudinal end of said spacer,
whereby said spacer is moved in the longitudinal direction by extension or retraction of said stem.

8. Device according to claim 1,
additionally comprising
means for separately supporting the upper and lower plates apart from one another, whereby the lower plate can be loaded without hindrance from the upper plate.

9. The combination of claim 8, wherein the plates are separately supported with said spacer coupled to the upper plate being spaced apart from the lower plate.

10. The combination of claim 8, wherein said supporting means comprise
a pair of stationarily mounted uprights,
a first pair of supports, each said support of said first pair being mounted on a respective upright to support the upper plate, and
a second pair of supports, each said support of said second pair being mounted on a respective upright underneath a support of said first pair, for supporting the lower plate.

11. The combination of claim 10, wherein said first pair of supports are fixedly mounted on respective uprights, and said second pair of supports are adjustably mounted on said respective uprights.

12. The combination of claim 11, wherein said spacer is positioned to rest upon an upper surface of the lower plate when the plates are assembled in the stack.

* * * * *